United States Patent [19]
Hallgren

[11] Patent Number: 5,351,835
[45] Date of Patent: Oct. 4, 1994

[54] DEVICE FOR STORING CASSETTES FOR CD-RECORDS

[75] Inventor: Anders Hallgren, Stockholm, Sweden

[73] Assignee: CD Ware i Stockholm AB, Pilgrimstad, Sweden

[21] Appl. No.: 70,438

[22] PCT Filed: Dec. 6, 1991

[86] PCT No.: PCT/SE91/00843
§ 371 Date: Jun. 4, 1993
§ 102(e) Date: Jun. 4, 1993

[87] PCT Pub. No.: WO92/10115
PCT Pub. Date: Jun. 25, 1992

[30] Foreign Application Priority Data
Dec. 7, 1990 [SE] Sweden ............................ 9003918

[51] Int. Cl.$^5$ ................................................ A47F 7/00
[52] U.S. Cl. ............................................ 211/40; 211/88
[58] Field of Search .................... 211/40, 41, 71, 88, 211/182; 206/309; 312/12

[56] References Cited

U.S. PATENT DOCUMENTS

| | | |
|---|---|---|
| 4,290,530 | 9/1981 | Wooster . |
| 4,573,749 | 3/1986 | Massaro .................. 211/40 |
| 4,867,306 | 9/1989 | Factor ..................... 211/40 X |
| 4,940,147 | 7/1990 | Hunt ....................... 211/40 |
| 5,027,955 | 7/1991 | Shoemaker, Jr. et al. ....... 211/41 X |
| 5,040,687 | 8/1991 | Whittington ............. 211/40 |
| 5,105,952 | 4/1992 | Knattiger ................ 211/41 |
| 5,172,817 | 12/1992 | Gross .................... 211/40 |
| 5,232,089 | 8/1993 | Kim ...................... 211/40 |

FOREIGN PATENT DOCUMENTS
8404021-1 8/1984 Sweden .

Primary Examiner—Alvin C. Chin-Shue
Assistant Examiner—Sarah A. Lechok
Attorney, Agent, or Firm—Klarquist, Sparkman, Campbell, Leigh & Whinston

[57] ABSTRACT

A device for storing parallelepipedic cassettes (K) for CD records comprises a plurality of supporting means (1) disposed on a wall. The cassettes are supported side by side and above each other on the supporting means for forming a wall picture made up of the cassettes.

4 Claims, 2 Drawing Sheets

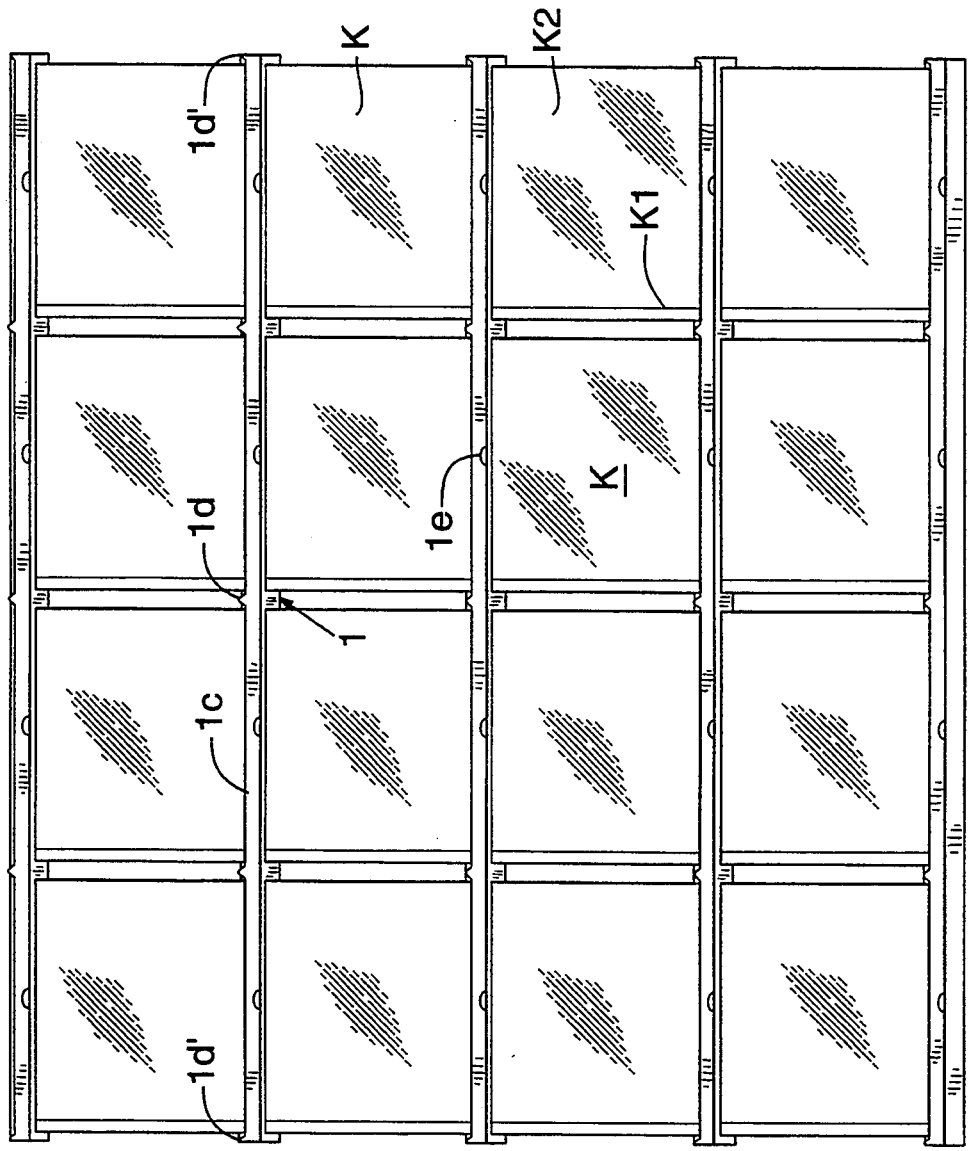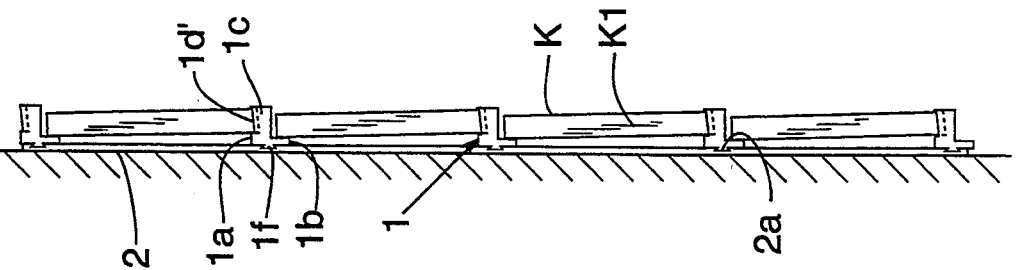

DEVICE FOR STORING CASETTES FOR CD-RECORDS

TECHNICAL FIELD

The present invention relates to a device for storing casettes for CD records, i.e. for gramophone records of the compact disc type. These casettes are parallelepipedic and of a relatively flat shape. Their front surfaces contain information on what has been recorded on the CD and there is often a picture or other presentation, which is usually brightly coloured and/or decorative.

PRIOR ART

It is known to store CD records in boxlike racks, in which the records bear against each other, front surface to rear surface. Further, it is known to store the records spaced apart somewhat, front surface to rear surface, in a rack containing pockets disposed beside each other and having a configuration making it possible for each record to be swung in the pocket relative to the other records.

A disadvantage of storing casettes containing CD records in this way is that the information on their fronts is not immediately accessible. A further disadvantage is that they have to be placed on a horizontal storage surface.

DESCRIPTION OF THE INVENTION

It is an object of the present invention to eliminate, at least partly, the disadvantages of the previously known storage devices for casettes for CD records. A further object of the invention is to utilize the pictures or other presentation on the front surfaces of the casettes, composing them such that they form an informative and/or aestethically pleasing wall picture.

Said objects are achieved by the device according to the invention being provided with the features stated in the claims.

DESCRIPTION OF THE FIGURES

FIG. 1 is a plan view, seen straight from the front, of a device according to the invention with casettes stored therein, FIG. 2 is a view, seen from the left, of the device of FIG. 1 including casettes.

PREFERRED EMBODIMENT

Figure 3:
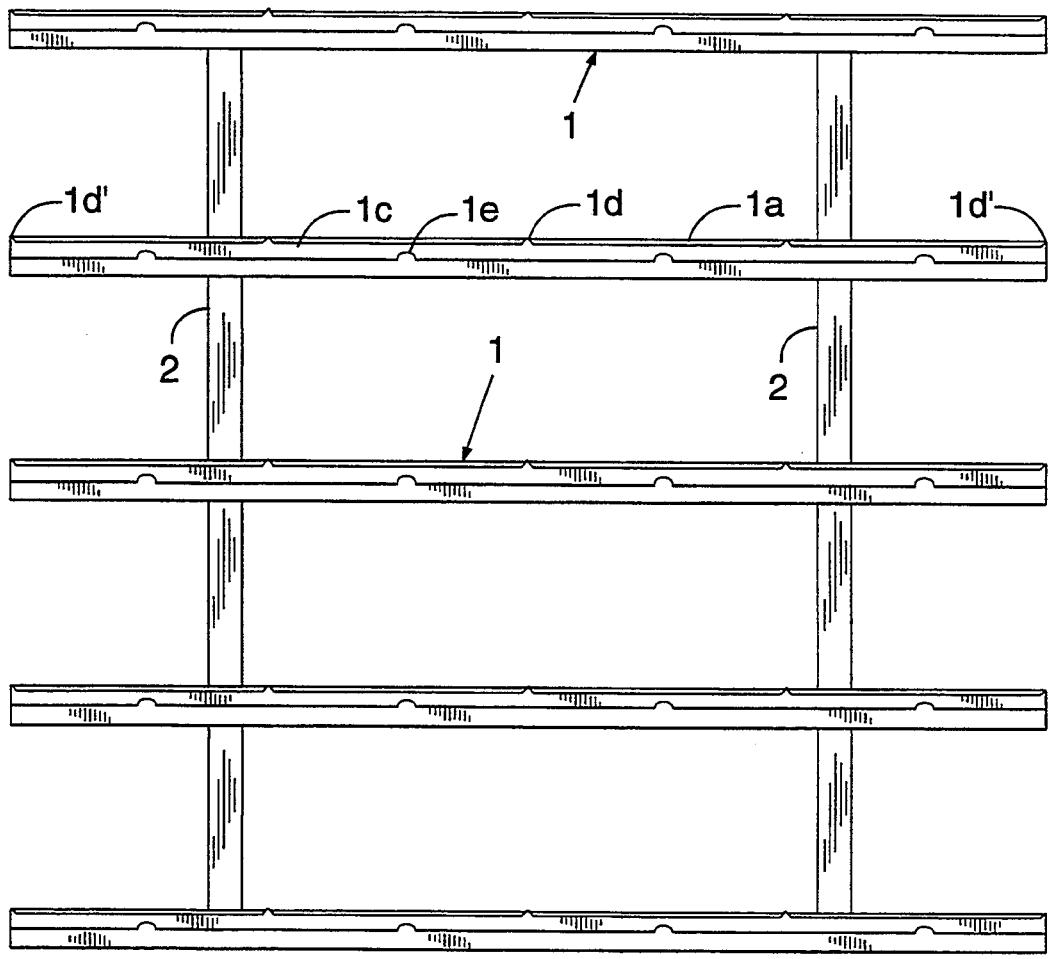
FIG. 3 is a plan view, seen straight from the front, of the device of FIG. 1 without casettes.
Figure 4:
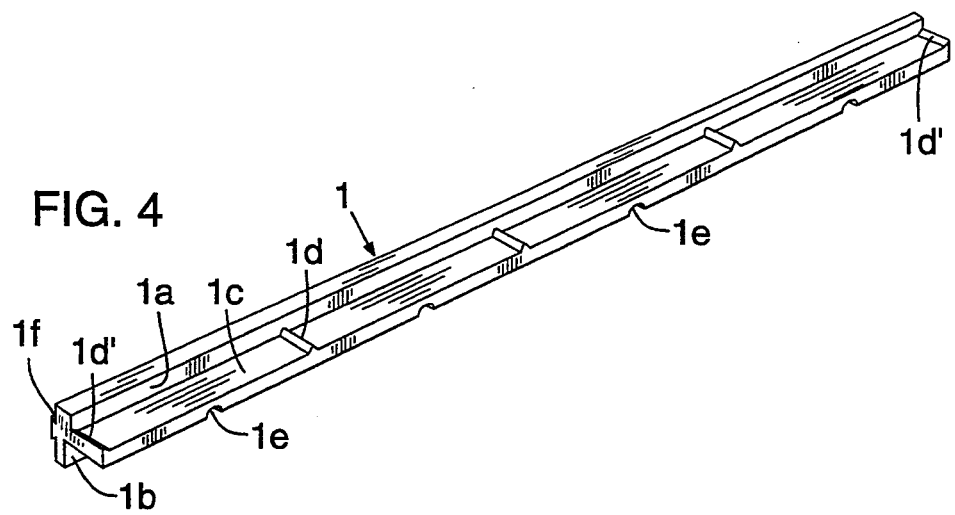
FIG. 4 is a perspective view of a profiled bar forming part of the device of FIGS. 1–3.

In FIG. 1 the device according to the invention is shown supporting 4×4=16 conventional casettes K for CD records. Each casette has a flat parallelepipedic shape with a box-shaped base (not shown), provided with a spine/side edge K1 and in which a CD record (not shown) is kept in place, and a cover K2 which is pivotably attached at both ends of the spine/side edge K1. The cover K2, or a sheet attached to the underside of the transparent cover, is provided with information on the contents of the CD record together with a picture often symbolizing the contents or what has been recorded on the record. The picture is usually decorative and brightly coloured.

The 16 casettes K supported by the device according to the invention are disposed beside each other and at essentially the same distance from each other, forming together a picture which makes it possible to easily and quickly identify the fronts of the casettes and therefore the contents of the casettes as well as to place the casettes on the device and to remove them from same in a simple way, said picture being at the same time aestetically pleasing.

The device according to the invention consists of two different kinds of parts, i.e. supporting means 1 and mounting bars 2. In the shown embodiment the number of supporting means 1 is five, and the number of mounting bars 2 is two. These numbers may be modified within wide limits, depending on the number of casettes K to be supported by the device.

Each supporting means 1 consists of a horizontal profiled bar, preferably made of extruded or cast aluminium. The profiled bar 1, the length of which is dependent on the number of casettes K to be supported beside each other by the device in a horizontal direction but which in the shown embodiment is somewhat greater than the total length of four casettes, has an essentially T-shaped cross section with an upwardly oriented leg 1a, a downwardly oriented leg 1b, and a horizontal leg 1c.

The leg 1c is provided with a flat upper surface inclining downwardly-inwardly towards the wall V on which the device is mounted and which surface is intended to support a casette K. The leg 1a is provided with an approximately vertical surface against which the lower portion of the rear surface of a casette is intended to bear in order to prevent the casette from being brought towards the wall V. The leg 1b is somewhat thinner than the leg 1a and has an approximately vertical surface against which the upper portion of the rear surface of a casette is intended to bear to prevent the casette from falling inwardly towards the wall. As shown in FIG. 2, said surface of the leg 1b of a profiled bar 1 is located closer to the wall V than said surface of the leg 1a.

The leg 1c of each profiled bar 1 is provided with a plurality of projections 1d of triangular cross section, which projections are spaced apart at a distance corresponding to the length of a casette. The triangular shape makes it possible to accurately center each casette on placing said casette on the profiled bar 1. At both ends of each profiled bar there is a "half" projection 1d'.

The leg 1c of each profiled bar 1 is also provided with a number of recesses 1e corresponding to the number of casettes each profiled bar is intended to support. Each recess 1e is located between two adjacent projections 1d. The recesses 1e facilitate removal of the casettes from the device in that is is possible to insert a finger in the recesses to swing the upper portions of the casettes outwardly from the wall.

Further, each profiled bar is provided with a dovetail projection 1f extending along its entire length.

The profiled bars 1 are mounted on the wall V by means of two or more vertical bars 2, which are suitably attached to the wall using screws. Each bar 2 suitably consists of an aluminium profile of rectangular cross section. The bar 2 is provided with equally spaced apart dovetail recesses 2a extending transversely to the longitudinal direction of the bar. The recess 2a has a cross section which is slightly larger than the one of a projection 1f.

On mounting device, the required number of profiled bars 1 will be pushed on to the required number of bars 2 via the dovetail projections 1f and the recesses 2a. The device made up of the profiled bars 1 and mounting bars 2 will then be mounted on the wall by securing the bars 2 to same by means of screws, such that the bars will be oriented as shown in FIG. 3. Alternatively, the bars 2 may be secured to the wall first, whereafter the profiled bars 1 will be pushed on to these.

After the device has been mounted, casettes K will be placed on same by first placing the lower portion of each casette on the upper inclined surface of the leg 1c, while the upper portion of the casette is held outside the device, whereafter the upper portion is swung inwardly towards the lower leg 1b of the profiled bar 1 located above. When the upper portion has been brought to bear against the leg 1b, the upper portion of the casette will incline inwardly relative to its lower portion, depending on the inclined upper surface of the leg 1c.

If required, several devices of the kind shown on the drawings may be mounted on a wall beside and/or above each other. When mounted beside each other, adjacent casettes K on two devices will be spaced apart at exactly the same distance as the casette on each device, owing to two "half" projections 1d' forming a complete projection of the same horizontal extension as a projection 1d.

While only one embodiment of the present invention has been described above and shown on the drawings it will be appreciated that the invention is not limited to said embodiment but only by what is stated in the claims.

I claim:

1. A device for storing parallelepipedal cassettes for CD records, the cassettes being of identical predetermined length and width, the device including a plurality of supporting means disposed on a wall, on which supporting means the cassettes are supported side by side and above each other for forming a wall picture made up of the cassettes, the supporting means consisting of a plurality of parallel, horizontal profiled bars, having supporting surfaces which support the cassettes, these horizontal bars being so arranged that the distance between adjacent cassettes will be essentially equal in the vertical and in the horizontal directions, a plurality of spacing means operatively connected to the horizontal bars to maintain the horizontal bars in predetermined vertically spaced apart relations, and each of the horizontal bars having a plurality of projections protruding from the cassette supporting surface thereof, which projections are integral with the horizontal bar and are spaced apart at a distance corresponding to the length of a cassette.

2. A device as set forth in claim 1, characterized in that each projection has an essentially triangular cross section for centering a cassette between two adjacent projections.

3. A device for storing parallelepipedal cassettes for CD records, the cassettes being of identical predetermined length and width, the device including a plurality of supporting means disposed on a wall, on which supporting means the cassettes are supported side by side and above each other for forming a wall picture made up of the cassettes, the supporting means consisting of a plurality of parallel, horizontal profiled bars, having supporting surfaces which support the cassettes, these horizontal bars being so arranged that the distance between adjacent cassettes will be essentially equal in the vertical and in the horizontal directions, a plurality of vertical bars operatively connected to the horizontal bars to maintain the horizontal bars in predetermined vertically spaced apart relations, and the horizontal bars are attached to at least two vertical bars disposed on the wall.

4. A device as set forth in claim 3, characterized in that the horizontal bars are provided with projections of dovetail cross-section extending in the longitudinal direction of the horizontal bar, and the vertical bars are provided with dovetail recesses, in which said projections of the horizontal bars are detachably pushed on to the vertical bars.

* * * * *